(12) United States Patent
Sempere-Belda et al.

(10) Patent No.: US 10,340,050 B2
(45) Date of Patent: Jul. 2, 2019

(54) METHOD OF DECONTAMINATING METAL SURFACES IN A COOLING SYSTEM OF A NUCLEAR REACTOR

(71) Applicant: Framatome GmbH, Erlangen (DE)

(72) Inventors: Luis Sempere-Belda, Erlangen (DE); Christian Guenther Topf, Forchheim (DE)

(73) Assignee: FRAMATOME GMBH, Erlangen (DE)

( * ) Notice: Subject to any disclaimer, the term of this patent is extended or adjusted under 35 U.S.C. 154(b) by 212 days.

(21) Appl. No.: 15/548,199

(22) PCT Filed: Feb. 5, 2015

(86) PCT No.: PCT/EP2015/052372
§ 371 (c)(1),
(2) Date: Aug. 2, 2017

(87) PCT Pub. No.: WO2016/124240
PCT Pub. Date: Aug. 11, 2016

(65) Prior Publication Data
US 2018/0033506 A1  Feb. 1, 2018

(51) Int. Cl.
| | |
|---|---|
| G21F 9/00 | (2006.01) |
| G21C 17/022 | (2006.01) |
| G21F 9/28 | (2006.01) |
| G21F 9/30 | (2006.01) |
| C23G 1/02 | (2006.01) |
| C23G 1/28 | (2006.01) |
| G21F 9/12 | (2006.01) |
| G21C 19/28 | (2006.01) |

(52) U.S. Cl.
CPC .............. *G21F 9/004* (2013.01); *C23G 1/02* (2013.01); *C23G 1/28* (2013.01); *G21C 17/0225* (2013.01); *G21F 9/001* (2013.01); *G21F 9/12* (2013.01); *G21F 9/28* (2013.01); *G21F 9/30* (2013.01); *G21C 19/28* (2013.01)

(58) Field of Classification Search
CPC .. G21F 9/00; G21F 9/004; C23G 1/02; C23G 1/28; G21C 17/0225; G21C 9/001; G21C 9/12
USPC .......................................................... 588/20
See application file for complete search history.

(56) References Cited

U.S. PATENT DOCUMENTS

| | | |
|---|---|---|
| 3,761,563 A | 9/1973 | Kaiser et al. |
| 4,756,768 A | 7/1988 | Bertholdt et al. |
| 4,913,849 A | 4/1990 | Husain |
| 5,278,743 A | 1/1994 | Bengel et al. |
| 9,390,822 B2 | 7/2016 | Park et al. |
| 2006/0167330 A1 | 7/2006 | Enda et al. |
| 2007/0071654 A1 | 3/2007 | Enda et al. |
| 2010/0154840 A1 | 6/2010 | Enda et al. |
| 2011/0162667 A1 | 7/2011 | Burke et al. |
| 2011/0209730 A1 | 9/2011 | Varrin, Jr. et al. |
| 2011/0303247 A1 | 12/2011 | Varrin, Jr. et al. |
| 2012/0169527 A1 | 7/2012 | Edvardsson |
| 2013/0220366 A1 | 8/2013 | Gassen et al. |
| 2013/0239983 A1 | 9/2013 | Burke et al. |
| 2014/0378733 A1 | 12/2014 | Park et al. |

FOREIGN PATENT DOCUMENTS

| | | |
|---|---|---|
| CN | 1512515 A | 7/2004 |
| CN | 102667958 A | 9/2012 |
| CN | 103209606 A | 7/2013 |
| EP | 2564394 A | 3/2013 |
| FR | 2699936 A1 | 7/1994 |
| GB | 2044982 A | 10/1980 |
| JP | S5566800 A | 5/1980 |
| JP | S60235099 A | 11/1985 |
| JP | 2012513006 A | 6/2012 |
| JP | 2013529299 A | 7/2013 |
| JP | 2015004675 A | 1/2015 |
| WO | 90/08385 A1 | 7/1990 |
| WO | 2010/094692 A1 | 8/2010 |

OTHER PUBLICATIONS

PCT International Search Report and Written Opinion dated Oct. 15, 2015 from corresponding Application No. PCT/EP2015/052372, 11 pages.
PCT International Preliminary Report on Patentability dated Feb. 9, 2017 from corresponding Application No. PCT/EP2015/052372, 7 pages.

*Primary Examiner* — Edward M Johnson
(74) *Attorney, Agent, or Firm* — Dilworth IP, LLC

(57) ABSTRACT

A method of decontaminating metal surfaces in a cooling system of a nuclear reactor comprises: an oxidation step, comprising at least one acidic oxidation step and at least one alkaline oxidation step wherein metal oxides and radioisotopes on the metal surfaces are contacted with aqueous permanganate oxidant solutions; followed by a decontamination step wherein an aqueous solution comprising oxalic acid, formic acid, citric acid, tartaric acid, picolinic acid, gluconic acid glyoxylic acid or mixtures thereof is used to dissolve at least part of the metal oxides and radioisotopes; and a cleaning step wherein radioisotopes are immobilized on an ion exchange resin; wherein at least one treatment cycle includes a high temperature oxidation step, wherein the permanganate oxidant solution is kept at a temperature of at least 100° C.

16 Claims, 2 Drawing Sheets

METHOD OF DECONTAMINATING METAL SURFACES IN A COOLING SYSTEM OF A NUCLEAR REACTOR

TECHNICAL FIELD OF THE INVENTION

The invention relates to a method of decontaminating metal surfaces coated with an oxide layer including radioactive nuclides in a cooling system of a nuclear reactor, and in particular a method of decontaminating metal surfaces in a cooling system of a pressurized water reactor.

BACKGROUND OF THE INVENTION

In many types of nuclear reactors, water is used as a coolant to transfer the energy from the reactor core for generating electricity. For example in a pressurized water reactor (PWR), water circulates through the reactor core and a primary loop system containing one or more reactor coolant pumps and one or more steam generators. In the steam generator, the heat from the primary coolant is transferred to a secondary loop of water which forms steam which then runs turbine electric generators. In a boiling water reactor (BWR), the water in the primary loop is under less pressure forming steam which is directly passed from the primary system to the turbine for generating electricity.

The piping of the reactor cooling system is usually made of stainless steel and to some extend Co alloys. The main surfaces inside the primary loops of a PWR and the steam generator tubes are made of Ni alloys such as Inconel™ or Incoloy 800. Under operational conditions of a nuclear reactor at temperatures of greater than 280° C., metal ions are leached out of the alloys of the piping and are dissolved and transported into the coolant. When passing the reactor core during operation, part of the metal ions are activated to form radioisotopes. During operation of the reactor these metal ions and radioisotopes are deposited as an oxide layer on metal surfaces inside the reactor cooling system.

Depending on the type of alloy used for a component or system, the oxide layers which are formed contain mixed iron oxides with divalent and trivalent iron as well as other metal oxide species including chromium(III) and nickel(II) spinels. Especially the oxide deposits formed on the metal surfaces of the steam generator tubes have a high chromium (III) or Ni(II) content which makes them very resistant and difficult to remove from the metal surfaces.

The need for the removal of these oxide layers arises from time to time due to the incorporation of radioactive matter that takes place during reactor operation: Over extended operating periods, the amount of the radioisotopes, such as Co-60, Co-58, Cr-51, Mn-54 etc., deposited on the inner surfaces of the reactor cooling system accumulates. This results in an increased surface activity or dose rate of the components of the reactor cooling system. The removal of this radioactive matter is often necessary to reduce the level of personnel radiation exposure before inspection, maintenance, repair and dismantling procedures are carried out on the cooling system, in accordance with the ALARA principle (As Low As Reasonably Achievable).

Many procedures are described to remove the oxide layers containing radioisotopes from metal surfaces of the cooling system in a nuclear reactor. A commercially successful method comprises the steps of treating the oxide layer with an oxidant such as permanganate in order to convert Cr(III) to Cr(VI), and subsequently dissolving the oxide layer under acidic conditions using a solution of an organic acid such as oxalic acid. The organic acid additionally serves to reduce a possible excess of oxidant from the preceding oxidation step, and to reduce the dissolved Cr(VI) to Cr(III) in the decontamination solution. An additional reducing agent can be added to remove the oxidant and convert Cr(VI) to Cr(III). The metal ions and activated radionuclides originating from the oxide layer and dissolved in the decontamination solution such as Fe(II), Fe(III), Ni(II), Co(II) and Cr(III) are then removed from the solution by passing them through an ion exchanger. After the decontamination step, the organic acid in the solution is decomposed by photocatalytic oxidation to form carbon dioxide and water.

In general, a plurality of treatment cycles comprising an oxidation step and an oxide layer removal or decontamination step are carried out in order to achieve a satisfactory reduction of activity on the metal surfaces. The reduction of surface activity and/or the dose reduction correlating to surface activity reduction is referred to as "decontamination factor". The decontamination factor is calculated either by the surface activity in $Bq/cm^2$ before decontamination treatment divided by the surface activity in $Bq/cm^2$ after the decontamination treatment, or by the dose rate before decontamination treatment divided by the dose rate after decontamination treatment.

Moreover, either the entire reactor cooling system including auxiliary systems or portions thereof which may be separated from the remaining systems, for example by valves, can be subjected to a decontamination treatment, or individual components such as main coolant pumps can be placed in a separate containers and treated for removal of the oxide layer formed thereon.

EP 2 564 394 discloses a process for the decontamination of components or systems of a nuclear power station, for example of a pressurized water reactor (PWR). The method comprises several treatment cycles, wherein each cycle includes an oxidation step in which the oxide layer formed on the metal surface is treated with an aqueous solution containing an oxidant, and a subsequent decontamination step, in which the oxide layer is treated with an aqueous solution of an organic acid. At least one oxidation step is carried out in an acidic solution, and at least one oxidation step is carried out in an alkaline solution. The document claims that changing the pH value of the oxidant solution from acidic to alkaline or vice versa will increase the overall decontamination factor.

However, it has been found that the above described decontamination treatment still requires a plurality (>5) of treatment cycles being performed in order to achieve satisfactory results for dose reduction or activity removal, thus resulting in a high amount of radioactive waste produced therewith.

SUMMARY OF THE INVENTION

Therefore, it is an object of the invention to provide a more effective decontamination process that reduces the number of treatment cycles and minimizes the amount of radioactive waste resulting from the decontamination treatment.

According to the invention, the object is solved by a method of decontaminating metal surfaces in a cooling system of a nuclear reactor, wherein the metal surfaces are coated with metal oxides including radioisotopes, and wherein the cooling system comprises one or more primary loops including a reactor coolant pump, and a residual heat removal system, the method comprises conducting a plurality of treatment cycles, with each of the treatment cycles comprising:

a) an oxidation step wherein the metal oxides including radioisotopes are contacted with an aqueous solution of a permanganate oxidant;
b) a decontamination step wherein the metal oxides subjected to the oxidation step are contacted with an aqueous solution of an organic acid selected from the group consisting of oxalic acid, formic acid, citric acid, tartaric acid, picolinic acid, gluconic acid, glyoxylic acid and mixtures thereof so as to dissolve at least part of the metal oxides and the radioisotopes; and
c) a cleaning step wherein at least the radioisotopes are immobilized on an ion exchange resin;
wherein the oxidation step comprises at least one acidic oxidation step and at least one alkaline oxidation step carried out one after another in either the same or different treatment cycles, and
wherein the plurality of treatment cycles comprises at least one treatment cycle including a high temperature oxidation step wherein the oxidant solution is kept at a temperature of at least 100° C. and wherein the at least one reactor coolant pump is used to circulate and heat up the oxidation solution inside the primary loop and the residual heat removal system is used to control the temperature of the oxidant solution during the high temperature oxidation step.

The inventors found that the decontamination factor will be significantly increased as compared to the process of EP 2 564 394 if at least one oxidation step is carried out at a high temperature of at least 100° C., preferably in a range of from greater than 100 to 150° C. Thus, the number of treatment cycles, the overall application time and most important the resulting radioactive waste can be significantly reduced. The method therefore results in high cost savings especially for full system decontamination.

The implementation of higher temperatures during the oxidation step of a state of the art decontamination process is not feasible due to technological limitations of currently existing external decontamination equipment, the use of which is required for a decontamination treatment.

The result of achieving a significantly increased decontamination factor by means of a high temperature oxidation step using temperatures beyond 100° C. of the aqueous oxidant solution was unexpected because generally the oxidation step is a diffusion-controlled process which is even more limited by the formation of a semi-solid manganese dioxide layer on the oxidized surfaces when using the above mentioned group of permanganates as oxidants.

The increased effectiveness of the high temperature oxidation treatment goes far beyond the mere effect on chemical kinetics that could be expected from a temperature increase as shown in established theoretical models such as the Arrhenius equation. The oxidation step in a chemical decontamination application, which is considered as the crucial step to achieve high decontamination factors, is strongly affected by diffusion processes. These processes become the limiting factor for the progress of the oxidation treatment during each treatment cycle. The increased diffusion of the oxidant through the oxide layer due to the increased temperature does not only affect the speed at which the oxide is affected and transformed by the oxidation treatment, but also influences the overall depth of the oxide layer that is affected by each oxidation treatment. The increased penetration of the oxidant into the oxide layer results in a reduction of the required treatment cycles, which not only results in a shorter application time but also in a lower amount of chemicals consumed and therefore in a lower amount of radioactive waste volumes generated in the process, as can be explained by the following chemical mechanisms.

The metals present in the oxide layer on the cooling system surfaces are not homogeneously oxidized and solubilized during an oxidation treatment. Chromium(III) is transformed into soluble chromate (Cr(VI)) and is dissolved in the oxidant solution. Additionally, during oxidation under acidic conditions a certain amount of nickel(II) is solubilized by mechanisms not necessarily involving a change of oxidation state of the nickel.

The dissolution of Cr(VI) and Ni(II) can be shown by analyzing the oxidant solution during the oxidation step. An increase of the amount of chromium(VI) in solution can be measured in both of the alkaline and acidic oxidation steps, and an increase of the nickel amount in solution can be measured during the acidic oxidation step in relation to the amount of chromium released.

Moreover, iron present as Fe(II) is also oxidized to Fe(III) but is practically not solubilized during the oxidation step. This is also confirmed by an analysis of the oxidant solution.

The metal oxide structures subjected to the oxidation treatment are therefore selectively dissolved. Some components remain on the metal surfaces and other components leave the structures and are transported into the oxidant solution, leaving vacant places in the metal oxide structures. The oxide structures remaining on the metal surface may therefore be considered metaphorically as a kind of sponge. The once very dense and compact spinel oxide structure becomes less dense and more porous.

The change of the oxide structures is further affected by the transition between oxidation states of iron(II) to the more voluminous iron(III).

Creating and enlarging of the pores formed in the oxide structures is a continuous process during the oxidation step. Therefore the oxidant may penetrate deeper and deeper inside the remaining oxide structure during the oxidation step, and in turn solubilize additional chromium and nickel.

However, the deeper these pores are, the longer it takes for the solubilized species to reach the body of liquid outside of the oxide structures, and the more difficult it gets for fresh oxidant solution to come into contact with untreated metal oxide surfaces.

In addition, the reduction products of the permanganate oxidant accumulate on the treated oxide surfaces in the form of hydrated manganese oxides and hydroxides. This layer again limits the mass transport and the exchange of fresh oxidant between the oxide structures and the oxidant solution.

All of these factors influence the dissolution rates of chromium and nickel and may slow down the overall reaction rate of the oxidation step. As the solubility of Cr(VI) as chromic acid in water is almost unlimited, the chromium concentration can be eliminated as a factor influencing the reaction rate.

The inventors now found that the diffusion of the oxidant through the pores in the oxide structures becomes more effective by increasing the temperature, which in turn increases the thickness of the oxide layer that can be removed during each treatment cycle and therefore reduces the total number of cycles required for a complete removal of the oxide structures on the metal surfaces.

State-of-the-art decontamination processes are usually applied in combination with an external decontamination equipment to achieve the decontamination targets. The process temperatures are kept below the boiling point of water to eliminate the need of using even more complex and expensive pressure-proof components for the design and installation of the external decontamination equipment. No presently existing external decontamination equipment is capable of operating under these conditions.

According to the invention, if state-of-the-art external decontamination equipment is used for decontamination treatment, it can be separated from the cooling system during the high temperature oxidation step wherein the oxidant solution is heated and kept at a temperature of at least 100° C., and the oxidation solution is circulated by operating only the plant internal systems such as the primary loop system including one or more reactor coolant pumps, the residual heat removal system, and if possible other auxiliary systems such as the chemical volume control system. Heating the oxidant solution up to the process temperature of at least 100° C. or more can be achieved using the waste heat of the reactor coolant pumps in the primary loops or circuits. Temperature control is achieved by operation of the residual heat removal system.

The chemicals for carrying out the oxidation step can be injected into the cooling system by using either the external decontamination equipment or power plant internal systems such as the common chemical injection system before raising the temperature of the oxidant solution to the target values of at least 100° C.

The duration of the oxidation treatment is not necessarily predefined, but can be adjusted dynamically based on an analytical monitoring of different parameters of the solution, such as evolution of the metal output, concentration of the oxidant, pH, conductivity, ORP and others. The necessary samples for analyzing the solution may be easily acquired through the chemical sampling system of the plant.

Although it may be sufficient to carry out only one treatment cycle comprising a high temperature oxidation step, the invention also comprises performing more than one or even all treatment cycles using the high temperature oxidation at 100° C. or more.

Preferably, the oxidant solution is kept at a presser of more than 1 bar during the high temperature oxidation step.

The construction and method of operation of the invention, however, together with additional objects and advantages thereof will be best understood from the following description of specific embodiments when read in connection with the accompanying drawings.

DETAILED DESCRIPTION OF THE INVENTION

According to the method of the present invention, oxide layers containing radioisotopes are effectively removed from metal surfaces in the cooling system of a nuclear reactor. The reactor cooling system is understood as comprising all systems and components which are in contact with the primary coolant during reactor operation, including but not limited to the primary loop(s) or circuit(s) including the reactor pressure vessel, reactor coolant pumps and steam generator(s), and auxiliary systems such as the residual heat removal system, chemical volume control system and reactor water clean-up system.

Figure 1:
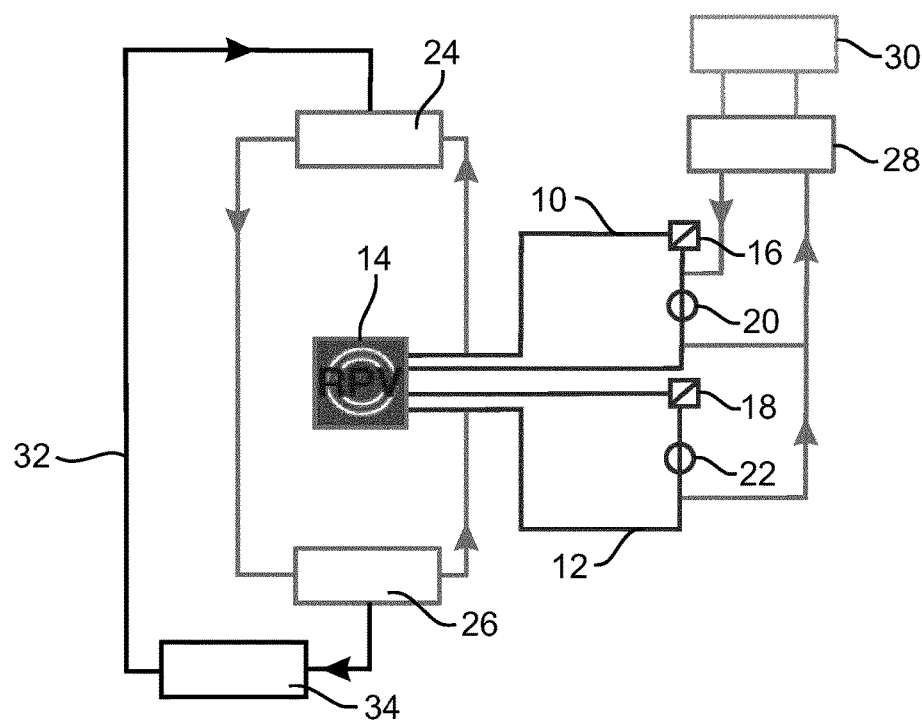
FIG. 1 is a schematic diagram of the decontamination system of the present invention.

Referring to the embodiment shown in FIG. 1, the reactor cooling system of a pressurized water reactor comprises at least two primary loops 10, 12 for circulating a primary coolant through the reactor pressure vessel 14 and steam generators 16 and 18. The primary coolant is circulated by means of reactor coolant pumps 20 and 22.

Residual heat removal (RHR) systems 24 and 26 including RHR system pumps (not shown) are coupled to the primary loops 10, 12. The coolant system further comprises a chemical volume control system (CVCS) 28 and a reactor water clean-up system 30 which are connected to the primary loops 10, 12 and which are also in contact with the primary coolant during power generating operation of the reactor.

An external decontamination equipment loop 32 is connected to at least one of the primary loops 10, 12 and/or the RHR systems 24 and 26. The decontamination loop 32 preferably is of a modular design and comprises a UV reactor 34 and at least one circulation pump, heaters, ion exchange columns, filters, sampling modules, monitoring systems, automation and remote controls and chemical injection equipment (not shown). The external decontamination equipment loop 32 may be connected to different components of the cooling system at different positions, wherein one possibility is connecting at two different RHR systems, as shown in FIG. 1. The UV reactor 34 is used for UV decomposition of decontamination chemicals, the sampling devices will be used during the treatment cycles for process control, and mechanical filtration may be performed during the decontamination step.

It is understood by those skilled in the art that the reactor design schematically shown in FIG. 1 may vary and is not limiting to the present invention.

The method of the present invention is suitable for a full system decontamination wherein the contaminated metal oxide layers are removed from all surfaces in the reactor cooling system that are in contact with the primary coolant during reactor operation. Typically a full system decontamination involves all parts of the primary circuit as well as the RHR systems, the chemical volume control systems and possibly other systems which are contaminated to a certain extent.

The decontamination method of the present invention is particularly useful for the decontamination of the cooling system in a pressurized water reactor (PWR), preferably a PWR comprising steam generator piping having metal surfaces of nickel alloys such as Inconel™ 600, Inconel™ 690 or Incoloy™ 800.

For removing metal oxides contaminated with radioisotopes from the metal surfaces in the reactor cooling system, the decontamination method comprises conducting a plurality of treatment cycles, wherein each of the treatment cycles comprises an oxidation step wherein the metal oxides including radioisotopes are contacted with an aqueous solution of a permanganate oxidant. The oxidation step is carried out in order to oxidize insoluble chromium(III) present in the metal oxide layer to soluble chromium(VI).

For carrying out the oxidation step, the components of the cooling system to be decontaminated are filled with the aqueous solution comprising the permanganate oxidant, and the oxidant solution is circulated through the cooling system. The oxidant solution can be introduced into the cooling system by means of the reactor CVC system 28 or the external decontamination equipment loop 32.

Preferably, the oxidant is selected from the group consisting of $HMnO_4$, $HMnO_4/HNO_3$, $KMnO_4/HNO_3$, $KMnO_4/KOH$ and $KMnO_4/NaOH$ or other metal salts of permanganate and/or metal hydroxides. These oxidants are able to oxidize chromium(III) to chromium(VI).

After a residence time of, for example, a plurality of hours, the oxidant solution is replaced or treated in such a way that it can be used in the subsequent decontamination step. Preferably, the oxidation step is terminated when no further increase in the chromium(VI) concentration can be determined.

Following the oxidation step, a decontamination step is carried out wherein the metal oxide layers are contacted with an aqueous solution of an organic acid selected from the group consisting of oxalic acid, formic acid, citric acid, tartaric acid, picolinic acid, gluconic acid, glyoxylic acid and/or mixtures thereof, so as to dissolve at least part of the metal oxides and the radioisotopes thereby forming a decontamination solution containing the radioisotopes and metal ions originating from the metal oxide. A residue of oxidant still present in the solution of the oxidation step is neutralized by an appropriate excess of the organic acid.

Preferably, the organic acid is oxalic acid.

The decontamination step is terminated as soon as no activity increase can be determined in the decontamination solution.

In a cleaning step following the decontamination step, the metal ions and radioisotopes leached from the oxide layer and dissolved in the decontamination solution are removed from the solution and immobilized on an ion exchange resin. Preferably, the cleaning step includes a decomposition of the organic acid by photocatalytic oxidation while simultaneously passing the decontamination solution through an ion exchanger column. The photocatalytic oxidation of the organic acid preferably comprises the step of exposing the organic acid to UV radiation whereby the organic acid is reacted to form carbon dioxide and water.

According to the method of the present invention, the plurality of treatment cycles preferably comprises at least one treatment cycle comprising an acidic oxidation step and another treatment cycle comprising an alkaline oxidation step. In the acidic oxidation step, the pH value of the aqueous solution of the oxidant is controlled to be less than about 6, preferably less than about 4, more preferably 3 or less. In the alkaline oxidation step, the pH value of the aqueous oxidant solution is controlled to be at least 8, preferably at least 10.

The order of the treatment cycles is not particularly limited. That is, the treatment cycle comprising the acidic oxidation step may be performed after the treatment cycle comprising the alkaline oxidation step, or vice versa. Moreover, there may be a number of subsequent treatment cycles each using an acidic or alkaline oxidation step, without a change between acidic and alkaline, followed by one or more subsequent treatment cycles using the other of an acidic or alkaline oxidation step.

Preferably there is at least one change between a treatment cycle comprising an acidic oxidation step and a treatment cycle comprising an alkaline oxidation step. The effect of changing between an acidic oxidation step and an alkaline oxidation step is that an increase in the decontamination factor is observed when compared to the decontamination factor of the preceding cycle.

The change between an acidic oxidation step and an alkaline oxidation step can also be carried out in one and the same treatment cycle. If a pH change is carried out within a single treatment cycle, for example by carrying out an oxidation step in acidic solution after an oxidation step in alkaline solution by substituting the acidic solution for an alkaline solution containing the oxidant or converting the alkaline oxidant solution in situ into an acidic solution, or vice versa, an increase in the decontamination factor is also achieved compared to a treatment cycle in which a plurality of oxidation steps are carried out without a pH change.

However, preference is given to carrying out a treatment cycle including an oxidation step in acidic solution and a subsequent treatment cycle including an oxidation step in alkaline solution, or vice versa.

The temperature of the oxidant solution in one or more of the oxidation steps may be in the range of from 60 to 95° C.

According to the method of the invention, at least one of the plurality of treatment cycles comprises a high temperature oxidation step wherein the oxidant solution is heated and kept at a temperature of at least 100° C., preferably at least 120° C., and more preferably to a temperature in the range of from 120 to 150° C.

In one embodiment, the high temperature oxidation step is an acidic oxidation step wherein the pH value of the aqueous solution of the permanganate oxidant is less than about 6, preferably less than about 4, more preferably 3 or less.

In other embodiments, the high temperature oxidation step is an alkaline oxidation step wherein the pH value of the aqueous permanganate oxidant solution is controlled to be at least 8, preferably at least 10, or both of the acidic oxidation step and the alkaline oxidation step are carried out as a high temperature oxidation step.

More preferably, more than one of the plurality of treatment cycles comprises a high temperature oxidation step, and most preferably, all of the treatment cycles comprise the high temperature oxidation step.

For carrying out the high temperature oxidation step, the external decontamination loop 32 is separated from the coolant system, and the oxidant solution is circulated through the cooling system by operating at least one of the pumps of the RHR systems 24, 26 and/or the reactor coolant pumps 20, 22 in the primary loops 10, 12.

The waste heat generated by the reactor coolant pumps is used to heat the solution of the oxidant to the desired process temperature of at least 100° C. or more. The RHR systems 24, 26 are operated to control and keep the process temperature of the oxidant solution at the predetermined value. Accordingly, the process temperature of the high temperature oxidation step can be controlled to be in the range of from 120 to 150° C. easily by operating only power plant system equipment without raising any safety issues.

After termination of the high temperature oxidation step, the oxidant solution is cooled down and the external decontamination equipment loop 32 can be (re-)connected to the reactor coolant system. The decontamination step is then started to reduce excess oxidant and dissolve the oxide layer in the organic acid solution, as described above, thereby forming the decontamination solution containing radioisotopes and metal ions originating from the metal oxide layers on the metal surfaces. Alternatively, the organic acid solution can be fed into the cooling system using the CVCS system 28.

The treatment cycle is completed by immobilizing at least the radioisotopes and preferably other metal ions on an ion exchanger (not shown).

The following laboratory examples further illustrate the invention but shall not be understood in a limiting sense.

Example 1

In this experiment, sections of contaminated tubing from a steam generator of a pressurized water nuclear reactor were used. Each section was cut longitudinally to provide two samples having dimensions of 4×3.5 cm and a surface area of 14 cm². The tubing and the samples consisted of Inconel™ 600. The initial surface activity of the samples was 2.7×10³ Bq/cm².

The samples were placed in separate containers and subjected to a total of ten (10) treatment cycles including alternating acidic and alkaline oxidation steps. The acidic oxidant solution was an aqueous solution of permanganic acid $HMnO_4$ having a concentration of 0.15 g/l and a pH less than 3. The alkaline oxidant solution was an aqueous solution of 0.2 g/l of potassium permanganate and 0.2 g/l sodium hydroxide. The samples were kept in the oxidation solutions for about 17 hours with agitation.

After each oxidation step, the samples were placed in a solution of oxalic acid having a concentration of 1 g/l in deionized water. The samples were kept in the organic acid solution for about 5 hours at a temperature of 95° C.

The oxidation steps of the first seven treatment cycles were carried out at a temperature of 95° C. In order to determine the effect of a high temperature oxidation, wherein the oxidant solution is heated to a temperature beyond the boiling point of the solution, one of the samples was subjected to a treatment cycle comprising an oxidation step still at 95° C., followed by two treatment cycles comprising a high temperature oxidation at 125° C. in an autoclave, whereas the other sample was subjected to three treatment cycles comprising high temperature oxidation at 125° C.

The following Table 1 gives the results of testing the samples using different temperature conditions during the oxidation steps.

TABLE 1

| Sample Size | | Sample 1 | | |
|---|---|---|---|---|
| 4 × 3.5 cm Sample Surface 14 cm² | Oxidation pH value [—] | Oxidation Temperature [° C.] | Decontamination Factor [—] | Surface Activity [Bq/cm²] |
| Initial Activity | | | — | 2.74E+03 |
| 1st Cycle | 8 | 95 | 1.3 | 2.13E+03 |
| 2nd Cycle | 3 | 95 | 1.4 | 1.93E+03 |
| 3rd Cycle | 8 | 95 | 2.0 | 1.38E+03 |
| 4th Cycle | 3 | 95 | 4.1 | 6.64E+02 |
| 5th Cycle | 8 | 95 | 5.3 | 5.21E+02 |
| 6th Cycle | 3 | 95 | 6.9 | 3.99E+02 |
| 7th Cycle | 8 | 95 | 7.5 | 3.64E+02 |
| 8th Cycle | 3 | 95 | 11.0 | 2.48E+02 |
| 9th Cycle | 8 | 125 | 20.8 | 1.31E+02 |
| 10th Cycle | 3 | 125 | 61.4 | 4.46E+01 |
| Sample Size | | Sample 2 | | |
| 4 × 3.5 cm Sample Surface 14 cm² | Oxidation pH value [—] | Oxidation Temperature [° C.] | Decontamination Factor [—] | Surface Activity [Bq/cm²] |
| Initial Activity | | | — | 2.73E+03 |
| 1st Cycle | 8 | 95 | 1.3 | 2.11E+03 |
| 2nd Cycle | 3 | 95 | 1.5 | 1.87E+03 |
| 3rd Cycle | 8 | 95 | 2.0 | 1.34E+03 |
| 4th Cycle | 3 | 95 | 4.0 | 6.81E+02 |
| 5th Cycle | 8 | 95 | 5.6 | 4.84E+02 |
| 6th Cycle | 3 | 95 | 7.1 | 3.84E+02 |
| 7th Cycle | 8 | 95 | 7.6 | 3.60E+02 |
| 8th Cycle | 3 | 125 | 20.4 | 1.34E+02 |
| 9th Cycle | 8 | 125 | 26.3 | 1.04E+02 |
| 10th Cycle | 3 | 125 | 151.0 | 1.81E+01 |

The effect of the high temperature oxidation step is apparent from a comparison of the decontamination factors of the 8$^{th}$ treatment cycle. Using the high temperature oxidation step in this cycle, about twice the amount of the surface activity was removed as compared to an oxidation step carried out below the boiling point of the oxidant solution.

The 9$^{th}$ and 10$^{th}$ treatment cycle were carried out with a high temperature oxidation step for both samples to confirm the results found for sample 2 and on sample 1. The increase of the decontamination factor for both samples is evident.

Figure 2:
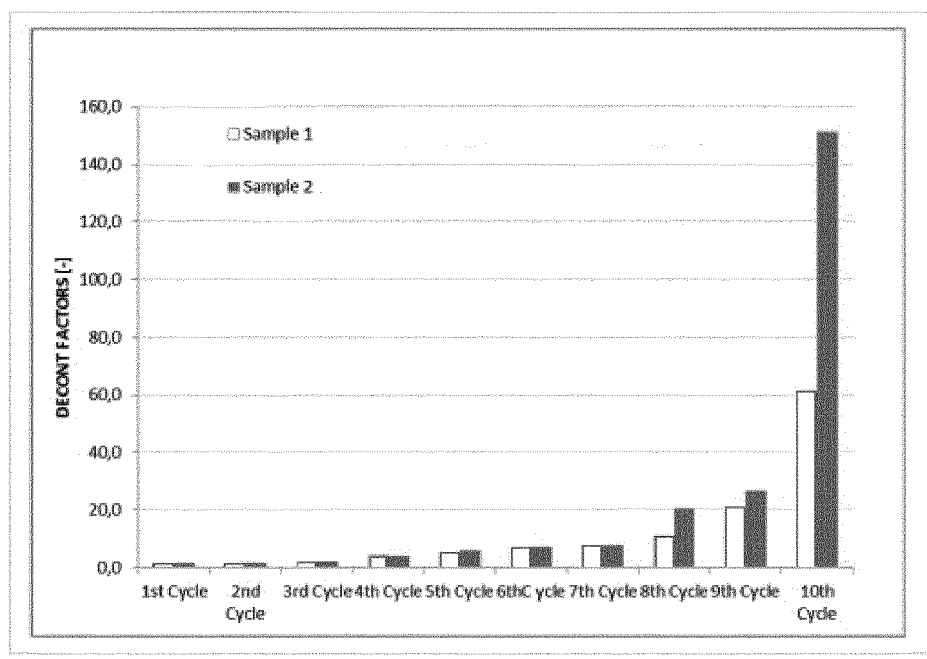
FIG. 2 shows a graph illustrating the increase of the decontamination factor according to the invention.

The results of Example 1 are also illustrated in FIG. 2 showing the development of the decontamination factor after each treatment cycle for samples 1 and 2.

Example 2

A similar experiment was conducted to show the efficiency of treatment cycles comprising high temperature oxidation steps with respect to a reduction of the number of treatment cycles. Two samples as described in Example 1 were subjected to a total of three treatment cycles under the same conditions as shown in Example 1, with the exception that all treatment cycles were carried out using a high temperature oxidation step. Further, sample 1 was subjected to a first treatment cycle comprising an alkaline oxidation step followed by two treatment cycles each comprising an acidic oxidation step. Sample 2 was subjected to treatment cycles using alternating alkaline and acidic oxidation steps, starting with a treatment cycle comprising an oxidation of the metal oxides under alkaline conditions, followed by a treatment cycle comprising an acidic oxidation step and a subsequent treatment cycle comprising an alkaline oxidation step.

The results of this experiment are given in the following Table 2.

TABLE 2

| Sample Size | | | Sample 1 | |
|---|---|---|---|---|
| 4 × 3.5 cm Sample Surface 14 cm² | Oxidation Temperature [° C.] | Oxidation pH value | Decontamination Factor [—] | Surface Activity [Bq/cm²] |
| Initial Activity | | | — | 2.58E+03 |
| 1st Cycle | 125 | 8 | 1.4 | 1.86E+03 |
| 2nd Cycle | 125 | 3 | 2.2 | 1.17E+03 |
| 3rd Cycle | 125 | 3 | 4.6 | 5.63E+02 |
| Sample Size | | | Sample 2 | |
| 4 × 3.5 cm Sample Surface 14 cm² | Oxidation Temperature [° C.] | Oxidation pH value | Decontamination Factor [—] | Surface Activity [Bq/cm²] |
| Initial Activity | | | — | 2.64E+03 |
| 1st Cycle | 125 | 8 | 1.4 | 1.87E+03 |
| 2nd Cycle | 125 | 3 | 2.3 | 1.16E+03 |
| 3rd Cycle | 125 | 8 | 5.7 | 4.66E+02 |

Figure 3:
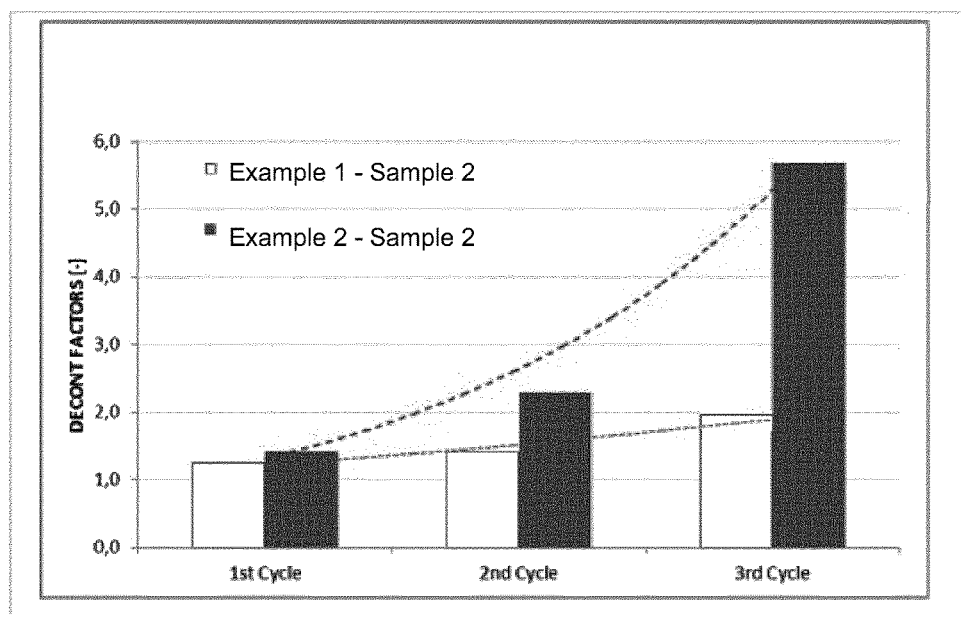
FIG. 3 shows a graph comparing the decontamination factor of a low temperature process to a high temperature process.

A comparison of the test results for Sample 2 of Example 2 with Sample 2 of Example 1, both of which are using alternating alkaline and acidic oxidation conditions, shows the efficiency of a high temperature oxidation. The high temperature oxidation used in Example 2 resulted in an overall decontamination factor of 5.7 after only three treatment cycles. Sample 2 of Example 1 required about 5-6 treatment cycles in order to achieve a comparable result, using low temperature oxidation conditions of below 100° C. The above comparison of the results of Examples 1 and 2 is also illustrated in FIG. 3.

The test results show that using the high temperature oxidation step according to the present invention may divide the number of treatment cycles required for full system decontamination in half. A rough calculation shows that the elimination of one treatment cycle results in a waste reduction in the order of between 2 I and 38 I of ion exchange resin per cubic meter of system volume. Depending on the reactor design, the total system volume may range from 120 to 800 m$^3$. It is immediately apparent that a reduction of the number of treatment cycles results in lower process costs as well as a reduction of the amount of radioactive waste.

Although the invention is illustrated and described herein as embodied in a method for surface decontamination, it is nevertheless not intended to be limited to the details shown, since various modifications and structural changes may be made therein without departing from the scope of the appended claims.

The invention claimed is:

1. A method of decontaminating metal surfaces in a cooling system of a nuclear reactor, wherein the metal surfaces are coated with metal oxides including containing radioisotopes, and wherein the cooling system comprises one or more primary loops including at least one reactor coolant pump, and a residual heat removal system, the method comprises conducting a plurality of treatment cycles, with each of the treatment cycles comprising:
   a) an oxidation step wherein the metal oxides containing radioisotopes are contacted with an aqueous solution of a permanganate oxidant;
   b) a decontamination step wherein the metal oxides subjected to the oxidation step are contacted with an aqueous solution of an organic acid selected from the group consisting of oxalic acid, formic acid, citric acid, tartaric acid, picolinic acid, gluconic acid, glyoxylic acid and mixtures thereof, so as to dissolve at least part of the metal oxides and the radioisotopes; and
   c) a cleaning step wherein at least the radioisotopes are immobilized on an ion exchange resin;
   wherein the oxidation step comprises at least one acidic oxidation step and at least one alkaline oxidation step carried out one after another in either the same or different treatment cycles, and wherein the plurality of treatment cycles comprises at least one treatment cycle including a high temperature oxidation step, during which high temperature oxidation step the permanganate oxidant solution is kept at a temperature of at least 100° C. and wherein the at least one reactor coolant pump is used to circulate and heat the oxidation solution inside the one or more primary loops and the residual heat removal system is used to control the temperature of the oxidant solution during the high temperature oxidation step.

2. The method according to claim 1, wherein the permanganate oxidant is selected from the group consisting of HMnO$_4$, HMnO$_4$/HNO$_3$, KMnO$_4$/HNO$_3$, KMnO$_4$/KOH and KMnO$_4$/NaOH.

3. The method according to claim 1, wherein the aqueous solution of the permanganate oxidant has a pH value of less than about 6 in the at least one acidic oxidation step.

4. The method according to claim 1, wherein the aqueous solution of the permanganate oxidant has a pH value of at least 8 in the at least one alkaline oxidation step.

5. The method according to claim 3, wherein the permanganate oxidant in acidic oxidation step comprises HMnO$_4$, HMnO$_4$/HNO$_3$ or KMnO$_4$/HNO$_3$ or other metal salts of permanganate.

6. The method according to claim 4, wherein the permanganate oxidant in the alkaline oxidation step comprises KMnO$_4$/NaOH or KMnO$_4$/KOH.

7. The method according to claim 1 wherein the plurality of treatment cycles comprises an alternating sequence of treatments cycles wherein a first treatment cycle comprising an acidic oxidation step is followed by a second treatment cycle comprising an alkaline oxidation step, or vice versa.

8. The method according to claim 1 wherein all of the plurality of treatment cycles comprise a high temperature oxidation step wherein the oxidant solution is kept at a temperature of at least 100° C.

9. The method according to claim 1 wherein during the high temperature oxidation step the oxidant solution is kept at a temperature in a range of from 120 to 150° C.

10. The method according to claim 1 wherein at least one acidic oxidation step comprises a high temperature oxidation step wherein the oxidant solution is kept at a temperature of at least 100° C.

11. The method according to claim 1 wherein at least one alkaline oxidation step comprises a high temperature oxidation step wherein the oxidant solution is kept at a temperature of at least 100° C.

12. The method according to claim 1 wherein the organic acid is oxalic acid.

13. The method according to claim 1 wherein the oxidant solution is kept at a pressure of more than 1 bar during the high temperature oxidation step.

14. The method according to claim 3, wherein the aqueous solution of the permanganate oxidant has a pH value of less than about 4 in the at least one acidic oxidation step.

15. The method according to claim 4, wherein the aqueous solution of the permanganate oxidant has a pH value of at least 10 in the at least one alkaline oxidation step.

16. The method according to claim 8 wherein during each of the high temperature oxidation steps the oxidant solution is kept at a temperature in a range of from 120 to 150° C.

* * * * *